July 10, 1956
R. B. MASON
2,754,332
PRODUCTION OF ALCOHOLS FROM OLEFINS
Filed June 2, 1952
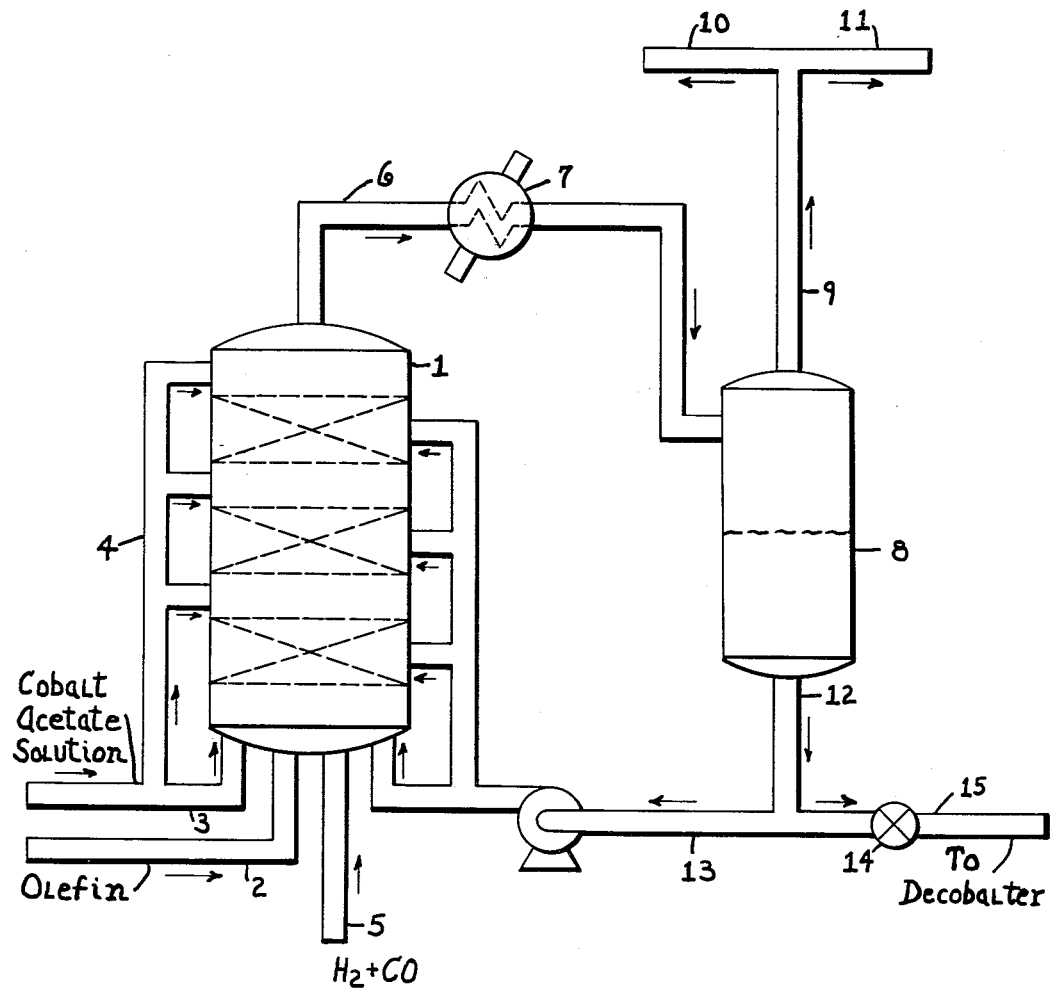
Ralph B. Mason  Inventor
By Henry Berk  Attorney United States Patent Office 2,754,332
Patented July 10, 1956

2,754,332
PRODUCTION OF ALCOHOLS FROM OLEFINS

Ralph B. Mason, Baton Rouge, La., assignor to Esso Research and Engineering Company, a corporation of Delaware Application June 2, 1952, Serial No. 291,239

8 Claims. (Cl. 260—604)

The present invention relates to the preparation of oxygenated organic compounds by the reaction of carbon compounds containing olefinic linkages with hydrogen and carbon monoxide in the presence of a carbonylation catalyst. More specifically, this invention relates to an improved process for increasing the rate of reaction for the formation of cobalt carbonyl in the carbonylation reaction zone and of maintaining high concentrations of active catalyst species in said zone.

It is well known in the art that oxygenated organic compounds may be synthesized from organic compounds containing olefinic linkages by a reaction with carbon monoxide and hydrogen in the presence of catalyst containing metals of the iron group in a two stage process in which predominantly aldehydes and minor proportions of ketones and alcohols are formed in a first step in the presence of a carbonylation catalyst comprising metals of the iron group, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

The carbonylation or Oxo reaction by which name this process is generally known, provides a particularly attractive method of preparing primary alcohols to supply the large market for plasticizers, detergents, solvents and the like. Amenable to the reaction are long and short chained olefinic compounds, not only hydrocarbons but most other organic compounds having a carbon-to-carbon olefinic linkage such as unsaturated alcohols, acids, esters and the like. Straight and branch chained olefins such as propylene, butene, pentene, hexene, heptene, styrene, olefin polymers such as di- and tri-isobutylene, hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p. s. i. g. and the ratio of synthesis gas to olefin may vary widely; in general, about 2500 to 25,000 cubic feet of $H_2 + CO$ per barrel of olefin feed are employed.

The catalyst for the first stage of the process is usually employed in the form of an oil-soluble compound of the catalytically active carbonylation metal. Thus there have been employed the salts of the metals such as iron or cobalt, and high molecular weight fatty acids such as stearic, oleic, naphthenic, linoleic and the like. Water soluble catalysts, such as cobalt acetate, chloride, and the like, have also been suggested. Catalyst concentrations may vary from about 0.5 to 5.0% by weight of the catalyst salt based on the olefinic feed. The first stage of carbonylation reaction is generally carried out at temperatures in the range of from about 250° to 450° F. depending upon the nature of the olefin and other reaction conditions. In general, the lower olefins will react at lower temperatures than the high molecular weight olefins. The carbonylation reaction is an exothermic one, with a heat release of the same high order of magnitude as in the hydrocarbon synthesis process, about 35 to 50 kcal./gram-mol olefinic double bond reacted and, therefore, careful temperature control is required in the reaction zone to prevent decomposition of cobalt carbonyl to metallic cobalt and also to prevent formation of secondary reaction products and undesired reactions, such as hydrogenation of the olefin, formation of hydrocarbon synthesis product, polymerization of Oxo products and the like. At 3000 p. s. i. g. (1500 p. s. i. g. CO partial pressure) cobalt carbonyl starts to decompose at an appreciable rate above 350° F., thus decreasing the concentration of active catalyst. On the other hand, temperatures are preferably kept above 300° F. so as to keep the reaction rate up to a reasonable figure to insure high olefin conversions at reasonable feed rates.

A problem inherent in a liquid phase Oxo process in which the catalyst is supplied as a salt of the carbonylation metal is the conversion of such catalytically inactive compound into the active species of the catalyst. There is good ground for believing that the active form of the carbonylation catalyst may be the carbonyl or the hydrocarbonyl of the metal, such as cobalt hydrocarbonyl, or some other molecule arising from the interaction of cobalt compounds with CO and $H_2$.

It is known that there is a definite time lag within the reactor which is required to convert the catalyst salt of the fatty acid to the carbonyl and, in a continuous process in which olefin, containing in solution the catalyst salt, and also the synthesis gases are fed concurrently into the bottom of the Oxo reactor, the actual interaction of the cobalt carbonyl and the olefin feed does not occur in the lower portion of the reactor because in that portion the cobalt carbonyl has first to be synthesized by interaction of carbon monoxide and hydrogen in the feed gas with the catalyst salt dissolved in the olefin feed; thus a substantial portion of the reactor plays no part in the catalytic conversion of the olefins to oxygenated products.

It has been found by experience that, though both oil-soluble and water-soluble cobalt compounds must first be converted into the active catalyst species, i. e. cobalt hydrocarbonyl, before there is any aldehyde product formation from olefins and CO and $H_2$, the oil-soluble cobalt salts, such as cobalt oleate, react far more quickly and completely than the water-soluble, oil-insoluble cobalt salts, such as cobalt acetate. This may in part be due to the fact that, in the case of the oil-soluble compounds, a homogeneous reaction system obtains, whereas in the case of the water-soluble compounds, such as low molecular organic acid salts, a heterogeneous system consisting of aqueous and immiscible liquid organic phases is in question.

It has previously been pointed out that there is a time lag between the interaction of a cobalt salt with CO and $H_2$, and the formation of the aldehyde product. The reaction requires considerable pressure, and at least moderately elevated temperatures of about 300–375° F. It is generally believed that the initial reaction is a thermal decomposition, under the reaction conditions, of the cobalt compound into metallic cobalt, which then reacts with the carbon monoxide and hydrogen present to form the cobalt hydrocarbonyl which, in turn, reacts with more CO and $H_2$ and with the olefin reactant to form the desired aldehyde product.

There are several distinct advantages that may be realized by employing a low molecular weight salt of cobalt, such as the acetate, over the high molecular weight fatty acid salt. The former is far cheaper, forms fewer contaminants in the reaction products, may be used in aqueous solutions, and, for a given weight of salt, contains a substantially greater proportion of cobalt. However, as has been pointed out, it is far slower in reacting and in producing cobalt carbonyl than are the high molecular weight fatty acid salts; not only may this difference be due to the homogeneity of the reaction mixtures comprising the latter, but the lower molecular weight salts have considerably higher thermal stability than the high molecular weight cobalt salts, and thus it is a considerably more difficult matter to convert such forms of cobalt as cobalt acetate to metallic cobalt than would be the case with cobalt oleate.

The following table demonstrates that, whereas a $C_7$ olefin, when reacted with CO and $H_2$ in the presence of a cobalt oleate catalyst at temperatures of 300–350° F., and pressures of 2700–3000 p. s. i. g., showed substantially no induction period, or only a short one, nonetheless, when the same feed was treated with an equivalent amount of cobalt in the form of cobalt acetate in aqueous solution under similar conditions of temperature and pressure, a substantial induction period of 3–7 hours was found necessary before the aldehyde synthesis reaction could start. It is during the induction period that cobalt carbonyl, enough to initiate and maintain the reaction, is built up.

*Induction period for Oxo reaction with $C_7$ olefin feed, 2700–3000 p. s. i. g.*

| Catalyst | Cobalt Oleate | | Cobalt Acetate (11% Aqueous Solution) | |
|---|---|---|---|---|
| Temperature, °F | 300 | | 350 | 300 | 350 |
| Cobalt Equivalent, Wt. Percent | 0.3 | 0.07 | 0.3 | 0.24 | 0.24 |
| Induction Period, Hrs | 0.5 | 0.05 | 0.03 | 7 | 3 |

It is a purpose of the present invention to disclose a process wherein a low molecular weight water-soluble salt may be employed as an aldehyde synthesis catalyst and reaction rates obtained therewith considerably higher than those hitherto found possible, accompanied by substantial decrease in induction period.

It is also a purpose of the present invention to accelerate substantially the production of cobalt carbonyl from low molecular weight water-soluble cobalt salts of organic acids.

Other and further objects and advantages of the present invention will become more apparent hereinafter.

It has now been found that the rate of formation of cobalt carbonyl may be greatly accelerated, and the induction period preceding aldehyde formation from olefin, be considerably reduced, when the reactor contains a metal above cobalt in the electrochemical series. This metal is most conveniently present as reactor packing, thereby affording a large surface for the reactants. These packing materials have been found to facilitate cobalt carbonyl formation by formation of metallic cobalt, which is free then to react with the carbon monoxide and hydrogen. Thus, there may be employed magnesium, iron and aluminum.

As mentioned above, the Oxo reaction depends upon formation of cobalt carbonyls by the reaction of the cobalt of the catalyst with carbon monoxide and hydrogen. With the more stable forms of cobalt salts, such as the formates, acetates, chlorides, etc., cobalt is not as readily available for reaction with carbon monoxide. However, an aqueous solution of these salts reacts almost instantaneously with a metal above cobalt in the electrochemical series to form metallic cobalt and the salt of the metal. This is represented by the equation Metal + cobalt salt → cobalt + metal salt The cobalt, so precipitated, is in a finely divided state and is readily available for reaction with the carbon monoxide present in the reactor to form cobalt carbonyls, which are the catalysts for the Oxo reaction.

In this work the packing is expendable and is slowly removed as the salt of the metal or as hydroxides resulting from the reaction of the metal salt with the water used to effect solution. The metal salts of the low molecular weight acids are either water soluble or are easily hydrolyzed. Thus a separation from the Oxo product is effected by removing the aqueous phase and by filtering before passing to the decobalter. The use of the metal packing provides for such efficient use of cobalt salt so that low concentrations can be used and essentially no cobalt remains as salt in the aqueous phase.

The present invention will best be understood from the more detailed description hereinafter, wherein reference will be made to the accompanying drawing which is a schematic illustration of a system suitable for carrying out a preferred embodiment of the invention.

Referring now to the drawing, an olefinic hydrocarbon having one carbon atom less than the number of carbon atoms in the desired resulting aldehyde product is fed through feed line 2 to the bottom of primary reactor 1. Reactor 1 comprises a reaction vessel which is preferably divided into discrete packed zones separated by trays and free space, and supported by grids. In accordance with the present invention, each zone is packed with a metal cobalt in the E. M. F. series. The metal may be present in the form of turnings, rings, pellets, rods, net or other forms that present a large surface area.

Though the olefinic compound may contain dissolved therein 1–3% by weight of an oil-soluble cobalt salt, such as cobalt oleate, the invention finds its most useful application when a water soluble, oil-insoluble catalyst is employed. Thus, aqueous saturated solutions of cobalt formate, acetate, or the like may be injected at one or more points into reactor 1 through lines 3 and 4. Adding the aqueous solution downstream is particularly beneficial inasmuch as the water is more soluble in the aldehyde product present to a greater extent toward the top of the reactor than in the olefin product found near the olefin feed inlet area.

Simultaneously a gas mixture containing $H_2$ and CO in the approximate ratio of 0.5–2 volumes $H_2$ per mole of CO is supplied through line 5 and flows concurrently with the olefin, aldehyde product, and water upwardly through reactor 1. Reactor 1 is preferably operated at pressures of about 2500–3500 p. s. i. g., and temperatures of about 300–375° F. The rate of flow of olefins through reactor 1 is about 0.1–1.5 v./v./hr.

As a result of the presence of the auxiliary metal, the residence time of the reactants within vessel 1 is relatively short. Temperatures must be carefully controlled. Too high temperatures, above about 375–400° F., cause decomposition of cobalt carbonyl into the metal; however this form of the metal is not suitable for the immediate reformation of cobalt carbonyl on cooling.

Liquid oxygenated reaction products comprising aldehydes are withdrawn from the upper portion of reactor 1 through line 6. The product, which is at a temperature of about 300–375° F., is then passed to cooler 7, where the temperature is lowered to about 60–120° F., and then passed to high pressure gas-liquid separator 8. Herein separation of unreacted gases from liquid product occurs. The unreacted gases may be withdrawn through line 9, and after scrubbing, may be recycled to the system via line 10, or in part purged. Liquid aldehyde product containing high concentration of cobalt carbonyl is withdrawn from high pressure separator 8 through line 12. A portion of this stream is preferably passed via line 13 to aldehyde synthesis reactor 1 to supply both cooling and a portion of the catalyst requirements of that vessel, the amount of product recycled being a function of the amount of cooling required in the reactor. The recycled liquid is preferably added along the length of reactor 1, injected into the zones packed with the metals of the present invention.

Liquid aldehyde product not recycled to reactor 1 is passed through pressure release valve 14 and line 15. This material, containing dissolved cobalt carbonyl, is sent to a catalyst decomposition or decobalting zone (not shown), where in the presence of heat and an inert gas, or steam, or water, or dilute organic acid, the cobalt contaminant is removed from the aldehyde product, all in a manner known per se.

The process of the invention admits of numerous modifications apparent to those skilled in the art. Thus, it may be desirable to operate the reactor 1 as a cobalt carbonyl generator rather than as an aldehyde synthesis reactor. In such case, the temperature is preferably dropped to about 200–250° F., which conditions do not favor the aldehyde synthesis reaction, but appear best for cobalt carbonyl production. The presence of the metal of the invention greatly accelerates this process.

The process of the invention may be further illustrated by the following specific examples wherein $C_7$ olefins were treated in the presence and absence of certain typical metals above cobalt in the electromotive series.

| Feed | $C_7$ Olefins—500 Grams | | | |
|---|---|---|---|---|
| Catalyst | 5 Grams Cobalt Acetate in 40 Grams $H_2O$ | | | |
| Unit | 3 Liter-Shaker Autoclave | | | |
| Pressure, p. s. i. g | 2,800 | | | |
| Temperature, ° F | 300 | 300 | 350 | 300 (2 Hrs.) / 350 (7 Hrs.) |
| Packing | None | Al | None | Al |
| Grams Packing | 0 | 500 | 0 | 500 |
| Induction Period, Hrs | 7 | 1 | 3 | 1 |
| Hydrogenated Product Distribution: | | | | |
| Wt. Percent Hydrocarbon, <240° F | 8.0 | 7.7 | 9.3 | 9.7 |
| Wt. Percent 240–340° F. Fract | 1.3 | 2.1 | 1.7 | 1.6 |
| Wt. Percent $C_8$ Alcohol 340–390 | 67.0 | 67.1 | 74.3 | 79.4 |
| Wt. Percent 390° F. Bottoms | 23.7 | 23.1 | 14.7 | 8.3 |

The above data show that the induction period for the aldehyde synthesis reaction step may be substantially reduced when aluminum is the reactor packing. Though increase in temperature decreases induction period even without packing, the per cent decrease in the case when extraneous metal is present is even greater than when no packing is present.

Although iron presents some difficulties because of product contamination, it serves admirably as a packing material to speed up the reaction. As further demonstration that the packing material contributes to the lessening of the induction period the performance of iron is listed below in comparison with operation with no packing and with an inert packing.

| Feed | $C_7$ Olefin—500 Grams | | | | | |
|---|---|---|---|---|---|---|
| Catalyst | 5 Grams Cobalt Acetate in 40 Grams $H_2O$ | | | | | |
| Unit | 3 Liter-Shaker Autoclave | | | | | |
| Pressure, p. s. i. g | 2,800 | | | | | |
| Temperature, ° F | 300 | 300 | 300 | 350 | 350 | 350 |
| Packing | None | Glass | Fe | None | Glass | Fe |
| Grams Packing | 0 | 500 | 500 | 0 | 500 | 500 |
| Induction Period, Hrs | 7 | 6 | 0.5 | 3 | 2.25 | 0.25 |

Because of the product contamination with iron carbonyl the product, when iron is the packing material, is preferably decobalted thermally in the presence of hydrogen or some stripping gas and the iron is separated from the cobalt by recognized procedures and the latter is converted to acetate and returned to the operation.

What is claimed is:

1. In the process wherein olefinic compounds are contacted in a reaction zone with carbon monoxide, hydrogen and an aqueous solution of a cobalt compound at elevated temperatures and pressures conducive to the production of aldehydes, the improvement of reducing the induction period which comprises maintaining in said reaction zone a metal above cobalt in the electromotive series, said metal being selected from the group consisting of aluminum, iron and magnesium.

2. The process of claim 1 wherein said metal comprises the packing in said reaction zone.

3. The process of claim 1 wherein said cobalt compounds are low molecular weight organic salts of cobalt.

4. The process of claim 3 wherein said salt is cobalt acetate.

5. The process of claim 2 wherein said packing is present in a relatively finely divided form presenting a large surface area to said reactants.

6. The process of claim 2 wherein said packing comprises iron.

7. The process of claim 2 wherein said packing comprises aluminum.

8. The process of claim 2 wherein said packing comprises magnesium.

References Cited in the file of this patent

UNITED STATES PATENTS

| 2,449,470 | Gresham et al. | Sept. 14, 1948 |
| 2,604,491 | Hale | July 22, 1952 |
| 2,671,119 | Mertzweiller | Mar. 2, 1954 |
| 2,671,814 | Mertzweiller | Mar. 9, 1954 |

FOREIGN PATENTS

| 644,665 | Great Britain | Oct. 18, 1950 |

OTHER REFERENCES

I. G. Farben (I), Patent Appl. I 57,906 IVd/120 O. Z. 12,360.

I. G. Farben (II), Patent Appl. I 71,966 IVd/120 O. Z. 13,166 Mar. 12, 1946, pp. 17 to 19 and 35 to 37. Both in T. O. M. Reel 36, Item 21 and part of Item 36.